United States Patent [19]

Rothschild

[11] 4,209,364
[45] Jun. 24, 1980

[54] PROCESS OF WATER RECOVERY AND REMOVAL

[76] Inventor: Herbert F. Rothschild, 1805 NW. 202nd, Seattle, Wash. 98177

[21] Appl. No.: 459,570

[22] Filed: Apr. 10, 1974

[51] Int. Cl.² .............................................. C02B 1/04
[52] U.S. Cl. ...................................... 203/11; 203/42; 203/25; 203/DIG. 4; 62/101
[58] Field of Search ................. 203/11, 10, 42, 91, 203/25, DIG. 4, DIG. 8; 55/31, 32; 62/476, 101; 202/235

[56] References Cited

U.S. PATENT DOCUMENTS

| | | | |
|---|---|---|---|
| 3,288,686 | 11/1966 | Othmer | 203/11 |
| 3,306,346 | 2/1967 | Othmer | 62/476 |
| 3,710,852 | 1/1973 | Porter | 62/476 |

*Primary Examiner*—Wilbur L. Bascomb, Jr.

*Attorney, Agent, or Firm*—Seed, Berry, Vernon & Baynham

[57] ABSTRACT

Recovery of substantially pure water for reuse from waste feed solutions, saline solutions, etc. is carried out at considerably lower capital and/or operating costs using a modified absorption cycle. The process is carried out under vacuum so that relatively low temperature heat sources can be used to evaporate water as well as high temperature sources. The system comprises an evaporator, an absorber, a generator and condenser. A portion of the feed solution entering the evaporator vaporizes due to its latent heat and the vacuum of the system. The water vapor product is absorbed by an absorbent in the absorber. The absorbent solution is transferred to a higher pressure zone in the generator where the water held by the absorbent is vaporized. This vaporized water is condensed for recovery. A heat transfer medium is applied to each stage to either apply or remove heat as appropriate.

1 Claim, 3 Drawing Figures

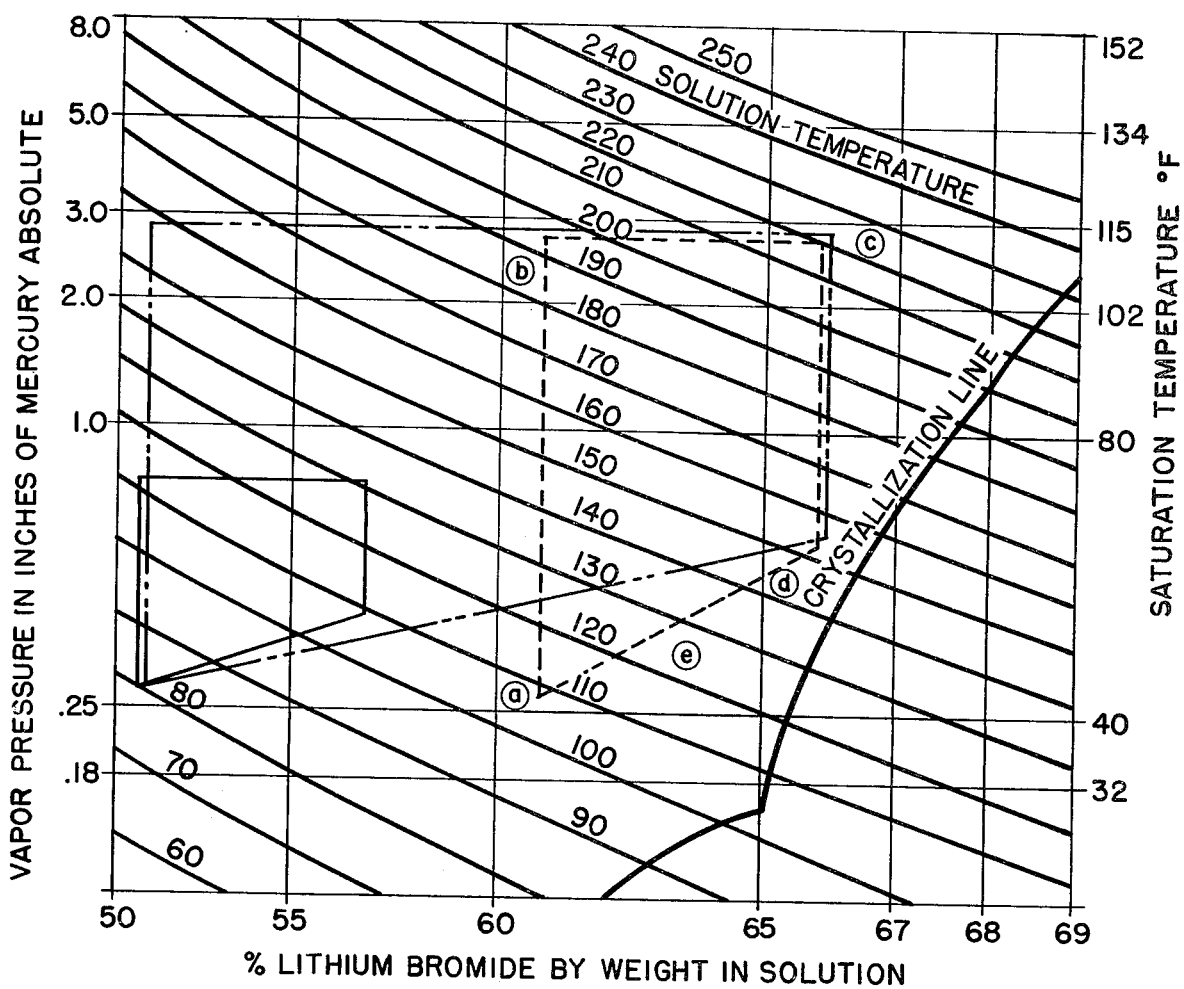

- - - - - TYPICAL ABSORPTION REFRIGERATION CYCLE
  - STEAM OR HOT WATER TO PROVIDE GENERATOR ENERGY $Q_G$
  - COOLING TOWER RETURN WATER FOR CONDENSING - $Q_A$ & $Q_C$

———— WATER PROCESSING CYCLE USING LOW TEMP. HEAT SOURCE
  - WASTE, SOLAR OR GEOTHERMAL AIR, HOT WATER OR STEAM GENERATING ENERGY $Q_G$
  - CHILLED WATER FROM EVAPORATOR OR OTHER LOW TEMP. COOLANT FOR CONDENSING - $Q_A$ & $Q_C$

— - - — WATER PROCESSING CYCLE USING HIGH TEMP. HEAT SOURCE
  - STEAM OR HOT WATER TO PROVIDE GENERATOR ENERGY $Q_G$
  - CHILLED WATER FROM EVAPORATOR OR OTHER LOW TEMP. COOLANT FOR CONDENSING - $Q_A$ & $Q_C$

FIG. 3

PROCESS OF WATER RECOVERY AND REMOVAL

BACKGROUND OF THE INVENTION

1. Field of the Invention

This invention is directed to a process and system for the recovery of water from waste solutions, saline solutions, etc. by a modification of the absorption refrigeration process.

2. Prior Art Relating to the Disclosure

Recovery of substantially pure water from a variety of solutions is necessary and desriable for numerous applications; however, the energy requirements, capital costs and operating costs for achieving water recovery by evaporation and subsequent condensation using conventional systems restrict its application. Conventional evaporation processes generally take place at or near the atmospheric boiling point of water, at which temperature scaling and corrosion are accelerated above the rates normally encountered at room temperatures and lower.

In the absorption principle commonly used in refrigeration, the cooling effect is produced by the vaporization of liquids using heat absorbed from relatively low temperature (55°-65° F.) fluid. The absorption-refrigeration cycle commonly uses water as a refrigerant, the water used solely as a heat transfer medium to cool extraneous materials and reject heat in a closed loop cycle. This invention makes use of an absorption-refrigeration cycle modified to recover and remove water from solutions thereof. This is accomplished by the expedient of having the water solutions to be evaporated replace the refrigerant water and having it an open loop system. Although the absorption principle of refrigeration is well known, it has not been applied to the recovery of water as described.

SUMMARY OF THE INVENTION

The method described combines and makes use of two known principles in a unique way: (1) that water will boil at low temperatures when in a vacuum; and (2) that certain solutions, such as lithium bromide, have the inherent ability to absorb and compress watervapor formed in the vacuum. The combination of these two principles according to the method described makes it possible (1) to vaporize water at relatively low temperatures using energy that is generally wasted and (2) to recover the pure water vapor and energy for reuse.

The primary object of this invention is to provide a process and system for separating essentially pure water from solutions containing dissolved and undissolved materials using a modification of the absorption principle of refrigeration. Further objects of this invention are to provide a process and system for recovering essentially pure water from solutions of the same (1) wherein boiling (phase change) temperatures can be kept at a minimum so that waste and solar energy can be used so that scale formation and corrosion are minimized, (2) wherein production of such water becomes technically and economically feasible in locations remote from fixed power distribution systems.

These and other objects are carried out by (1) evaporating a portion of feed solution at relatively low temperature in an evaporator under vacuum, obtaining heat primarily from a heat exchanger, $[Q_E]$; (2) recirculating the feed solution in the vacuum through or around the heat exchanger until the desired concentration is reached; (3) absorbing water vapor from the evaporator in an absorbent circulated in an absorber, with the resulting heat of condensation being removed by a heat exchanger $[Q_A]$; (4) transferring the absorbent-water solution in the absorber to a generator drive off water from the dilute absorbent-water solution in the generator as water vapor deriving energy for vaporization from a heat exchanger $[Q_G]$; and (5) condensing the vaporized water in a condenser for discharge with the heat of condensation removed by a heat exchanger $[Q_C]$.

This invention is the basic process as described in the preceding paragraph. The operation of the process is independent of the media (gas, liquid, solid, etc.) used for energy transfer to or from the evaporator $[Q_E]$, absorber $[Q_A]$, generator $[Q_G]$ or condenser $[Q_C]$. It is also dependent on the source of energy supplied to the system $[Q_E]$ and $[Q_A]$ and $[Q_C]$.

BRIEF DESCRIPTION OF THE DRAWINGS

FIG. 3 is an equilibrium diagram for the lithium bromide-water solution for a water processing cycle using a low temperature heat source or a high temperature heat source.

DESCRIPTION OF THE PREFERRED EMBODIMENTS

Figure 1:
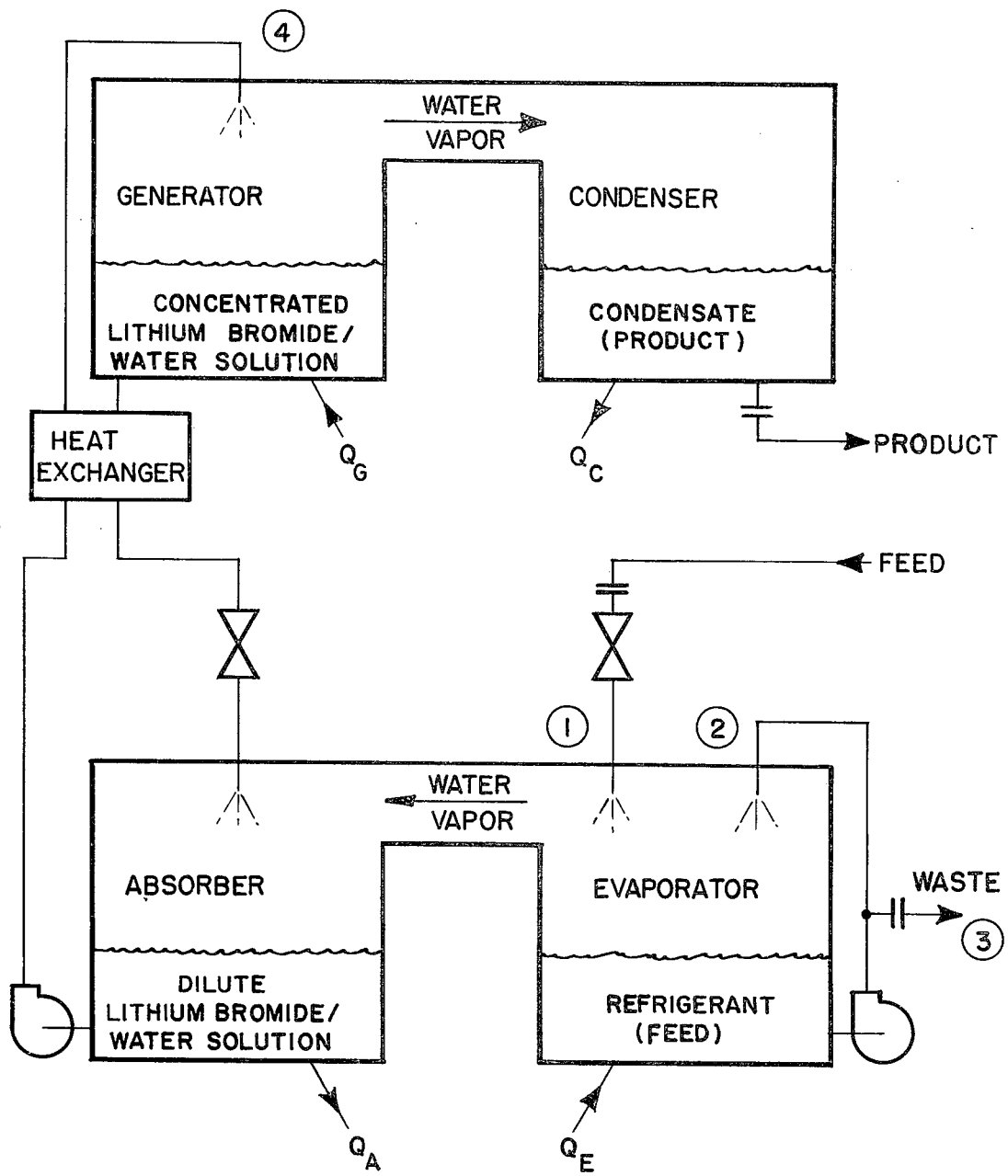
FIG. 1 is a schematic diagram of the basic process described herein.

Production of essentially pure water in large quantities for extended periods of time has considerable value in the fields of (1) desalinization, (2) cooling tower blow-down concentration, (3) recovery of potable or irrigation water from sea water and (4) purification of water entering streams and waterways from processing plants and other sources of water pollution. The system and method of water removal and recovery described herein offer advantages for the production of large or small quantities of water for extended periods of time over conventional systems. These advantages include: (1) low initial investment, (2) low energy consumption, (3) low operating cost, (4) low maintenance, (5) minimum operational disruption due to external causes (6) simplicity of operation and maintenance, (7) long equipment life and (8) recovery of water from corrosive or other hard-to-handle solutions with minimal problems.

In conventional water recovery systems using evaporative condensation methods, heat exchangers are required which must withstand the temperatures used and corrosive materials at the elevated temperatures. Additionally, they are limited in allowable levels of concentration due to scaling when processing hard water. The method may use very low temperature differentials for heat transfer in the evaporator. Since the absolute temperature is low, inexpensive materials may be used in fabricating the heat exchangers, such as certain corrosion resistant, non-metallic materials which are relatively inexpensive but which lose strength rapidly at elevated temperatures and cannot be used in conventional heat exchangers.

Since the process is carried out under vacuum, the system is preferably surrounded by a shroud or shell designed to withstand the vacuum pressures used. Most commonly, a steel cylinder is used. The shell is in compression so concrete or other lower cost materials may be used.

In the method and system described liquid pumps are used which are low in cost compared to vapor compressors utilized in some evaporative processes to recycle water vapor. The use of an absorbent to condense and compress the water vapor makes it possible to realize all of the advantages of low temperature evaporation possible in a vacuum. Without the use of an absorbent as applied in this cycle, either an extremely large vapor compressor would be required or refrigerated condenser water would be required, the cost of both is prohibitive. This process described herein not only provides an economical substitute but also results in a low temperature stream which can be used to increase productive capacity. Energy consumption can be much less than required for a conventional evaporative system, as the system can utilize the latent heat content of relatively low temperature media without the necessity for adding heat to the system. The system utilizes relatively low horsepower recirculation pumps and few moving parts which are subject to wear; thus the operating cost and maintenance are considerably reduced and the use of wind, solar or engine generated electrical energy is possible.

The absorption system described herein utilizes as an absorbent any absorbents such as lithium bromide, or other suitable material.

The term "strong solution" as used herein refers to a concentrated solution of the absorbent, strong in absorbing power. "Weak solution", as used herein, refers to a dilute solution of absorbent which is weak in absorbing power.

FIG. 1 is a schematic of the basic process and system. There are four primary process stations in the system all of which are under vacuum. The evaporator and absorber are interconnected and at essentially the same pressure (vacuum), this pressure being somewhat higher than in the interconnected generator and condenser. Each of the stations includes a heat exchanger ($Q_E$, $Q_A$, $Q_G$ and $Q_C$) having a liquid or gas circulated therein with the water, water vapor or absorbent-water solution circulated therearound.

Saline water, brine or other contaminated water as feed solution is introduced into the evaporator at 1. The evaporator is initially evacuated to a high vacuum. As the feed solution enters the evaporator a portion of it boils off due to its own latent heat. Additional heat may be supplied by a relatively hot medium in a heating coil or such other device [$Q_E$] causing additional feed solution to boil off. If there is not sufficient heat to evaporate all of the feed solution in one pass the feed solution is recirculated to enter the evaporator again at 2 until the desired amount of water is boiled off and the desired concentration of the feed solution reached. At that time a metered waste solution is discharged at point 3. Under a high vacuum the feed will boil at 35° to 45° F. To retain the vacuum it is necessary to (1) condense the vapor as fast as it is generated and (2) remove non-condensible gasses. The non-condensible gases are removed by a pump, ejector or other means. It may be necessary to pass the solution through a deaerator prior to the feed solution entering the evaporator in order to maintain a high vacuum.

To condense the evaporated water vapor, an absorbent solution such as a lithium bromide/water solution is circulated in the absorber which is open to the evaporator. The lithium bromide absorbs water vapor at a rate dependent on (1) the temperature of the lithium bromide/water solution in the absorber and (2) the concentration of water in the lithium bromide-water solution. The water vapor from the evaporator is condensed and compressed in the lithium bromide absorbent. The heat of condensation is removed from the absorber by a relatively cold heat transfer medium circulated through or around the absorber [$Q_A$]. This medium may be chilled water from the evaporator. To keep the solution in the absorber as concentrated as possible the water vapor is continuously driven off. To do this the absorbent/water solution is pumped from the absorber to the generator at 4.

The pressure (vacuum) in the generator is determined by the temperature of the condensing liquid in the condenser. In practice the heat transfer medium from the absorber [$Q_A$] is subsequently used as the heat transfer medium in the condenser and is generally somewhat hotter. The pressure in the generator/condenser pair, therefore, is somewhat higher.

The pressure in the generator/condenser has an effect on the temperature of the heat transfer medium for heating of the absorbent/water solution in the generator to boil it and drive off the water vapor. If a high temperature source is available or if the consumption of fuel to obtain a high temperature heat transfer medium is within economic feasibility for a given application the pressure is not critical. The amount of energy required to evaporate the water [$Q_G$] from the lithium bromide/water solution in the generator is about the same regardless of the temperature or pressure. A large part of the energy required can be conserved by using a heat exchanger intermediate the absorber and generator. If only low temperature waste feed solution or solar heat is available for use with the system described it is desirable to maintain as high a vacuum as possible in the system. The temperature and volume of the heat transfer medium to the condenser $Q_C$ then becomes critical.

The temperature required to boil the lithium bromide/water solution in the generator is higher than the water boiling temperature; therefore, the steam generated will be superheated. In this regard it is possible to pass the superheated steam through a prime mover connected between the generator and condenser to convert the thermal energy in the water vapor to work.

The condensate, distillate or pure water condensed in the condenser is pumped out of the system for use as desired. The water from the system exits at its condensation temperature. The heat still contained therein may be used for other purposes or it may be returned to the system by running it through a heat exchanger to give up some of its latent heat to the entering feed solution.

The system described is independent of the type of heat transfer medium or source of heating and cooling. These may vary with the specific application, economics and available sources.

Aside from the quantity of heating and cooling energy available temperatures are the governing factor. FIG. 3 illustrates a absorption cycle for recovery of water, a possible water processing cycle using a low temperature heat source such as waste solar or geothermal air, hot water or steam [$Q_G$] and a possible water processing cycle using a high temperature heat source such as steam or hot water. From the equilibrium diagram it is noted that the potential exists for operating the system with a maximum available temperature of about 130° F. while maintaining the water production capacity of the system if operated at refrigeration conditions. This illustrates the potential for operating the system on waste energy. If operated over the full potential range the unit could produce about three times as much water as at refrigeration conditions.

The designations (a), (b), (c), (d) and (e) used in FIG. 3 are as follows:

(a) Weak absorbent/water solution as it leaves absorber and enters heat exchanger.
(b) Temperature at which the absorbent/water solution begins to boil in the generator.
  (a)–(b)=amount of heat picked up in the heat exchanger plus the heat required to raise the absorbent/water solution to the boiling point.
(c) Where the absorbent/water solution reaches maximum concentration within generator temperature and heat limitations after some of water has boiled off.
  (b)–(c)=amount of heat required to boil off the water and reconcentrate the absorbent/water solution.
(d) Strong absorbent/water solution temperature after it has passed through the heat exchanger.
  (c)–(d)=The same amount of heat that was picked up by the weak absorbent/water solution as it passed through the heat exchanger on its way to the generator.
(e) Intermediate absorbent/water solution which is pumped from the absorber sump into the spray assemblies. It is absorbent/water solution at condition (d) after it has mixed with the absorbent/water solution at condition (a) in the absorber. This intermediate absorbent/water solution is then pumped through the absorber spray assemblies where it absorbs water vapor and is diluted back to a weak absorbent/water solution at condition (a).

There are an infinite number of combinations of conditions under which the system can operate. In general any of the four stations can be process limiting and the set of conditions selected depends on the application of the system and upon available heating and cooling media temperatures and heat quantities.

Figure 2:
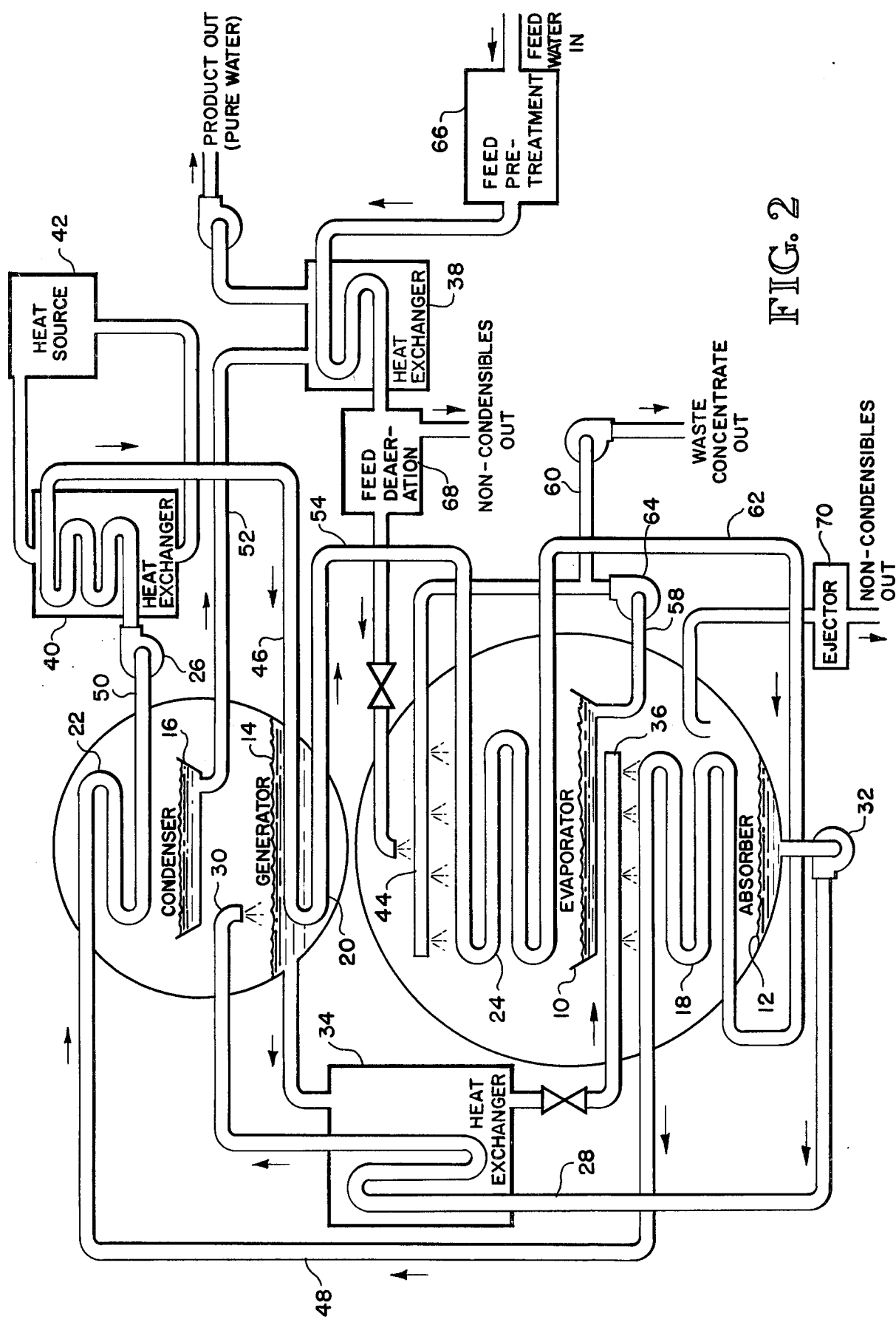
FIG. 2 is a schematic illustrating one embodiment of the process claimed for recovery of water using a modified absorption cycle.

FIG. 2 illustrates one embodiment of an absorption system comprising an evaporator 10, an absorber 12, a generator 14 and a condenser 16. A heat transfer medium is pumped by a heat transfer pump 26 through a heat source 42 and through heat exchangers 18, 20, 22 and 24 located in the absorber, generator, condenser and evaporator, respectively.

Feed solution is sprayed into the evaporator 10 through spray nozzle 44. Since the temperature of the entering feed solution is not sufficient to accomplish vaporization of the water from the absorbent in the generator external heat may be supplied. The product water evaporated passes from the evaporator to the absorber 12 where it is absorbed by the absorbent. The heat energy generated in the absorber by the heat of condensation is transferred through heat exchanger 18 to the heat transfer medium and is pumped through line 48 to the heat exchanger 22 in the condenser where additional heat of condensation is absorbed. The absorber is at a lower pressure than the condenser so that the rise in temperature of the heat transfer medium in the absorber will be sufficiently low for the absorber to be used as a heat sink in the condenser which has a higher condensing temperature. At the same time a portion of the heat energy contained in the weak absorbent solution in the absorber is pumped through line 28 by pump 32 and sprayed into the generator through nozzle 30. The heat energy in the generator 14 must be sufficient to vaporize water from the strong absorbent solution, the resulting water vapor flowing to condenser 16. In condenser 16, heat exchanger 22 absorbs heat energy which is transferred by the heat transfer medium through line 50 to the heat exchanger 40 where the temperature of the transfer medium is raised sufficiently to boil the absorbent solution in the generator. The heated transfer medium is directed to heat exchanger 20 in the generator through line 46 where much of the energy is given up in boiling the absorbent solution and vaporizing the water. Since the boiling temperature in the generator is higher than in the evaporator due to a higher pressure, the heat transfer medium is routed through line 54 to the evaporator heat exchanger 24 where the remaining heat is used to evaporate the feed solution. The heat transfer medium leaving the evaporator 10 has a temperature in the neighborhood of 40°–50° F. It is then routed through line 62 to the absorber heat exchanger 18 for removal of heat from the absorber 12 and subsequently from the condenser 16. It is the availability of this low temperature heat sink which in part makes it possible to use low temperature energy sources to operate the system economically. The water vapor produced by boiling of the absorbent in the generator is condensed in the condenser 16 and is discharged as pure product water through line 52. If sufficient latent heat remains in the discharge water, it may be directed through a heat exchanger 38 to recycle additional heat energy to the system through the incoming feed. The treated effluent remaining in the evaporator 10 is recycled through line 58 by pump 64 until the sufficient water has been vaporized to reach the desired concentration. At periodic intervals, the concentrate in the evaporator can be removed from the evaporator through line 60. The incoming feed water is processed through a feed pretreatment process 66 to treat it as necessary to remove non-condensibles in the stream and for corrosion control. The type of treatment will vary with the chemistry and content of the feed stream. The feed stream is processed through a deaeration section 68 to remove non-condensibles. Additional non-condensibles not thus removed and entering the system are continuously removed by an ejector 70.

The system is operated under a vacuum ranging from 0.2 to 0.5 inches Hg in the evaporator/absorber section and in the range of 0.5 to 4.0 inches Hg in the generator/condenser section. Under a vacuum of 0.25 inch, for example, water boils at approximately 40° F. The temperature of most feed solutions being treated is greater than 40° F. so that latent heat of solution accomplishes partial evaporation in the evaporator. Heat leaving the product water stream is retained in the system by transfer of the feed in heat exchanger 38. External heat is supplied by passing the heat transfer medium through a heat exchanger 40 to heat transfer from an external heat source 42. The external source can be a hot process stream, boiler, solar heater, geothermal heater or other source capable of raising the medium to 120° F. or higher.

Since the entering feed solution and heat added to the system does not have sufficient heat for total evaporation in one pass, the system and method described attempts to recover and reapply the heat energy contained repeatedly until the desired amount of water is removed. To accomplish this, the heat transfer medium is recirculated for heat conservation and reapplication.

The cycle operates without the need for externally applied heat provided that the heat content of the entering feed exceeds the system heat losses except as necessary to maintain boiling temperatures in the generator. External heat may be added to decrease start-up time or to optimize the output of the facility.

The system described provides a way of utilizing water resources, minimizing treatment thereof and making wise use of energy requirements.

The embodiments of the invention in which a particular property or privilege is claimed are defined as follows:

1. A process for recovering relatively pure water from aqueous feed solutions, comprising:
   (1) evaporating the feed solution under vacuum in an evaporation zone as water vapor, producing a more concentrated feed solution;
   (2) absorbing substantially all of the vaporized water in a relatively concentrated absorbent/water solution in an abosrption zone, the absorption producing concurrent generation of heat and a more dilute absorbent/water solution;
   (3) removing the heat released in the absorption zone;
   (4) passing the more dilute absorbent/water solution at a higher pressure than the absorption zone to a generation zone maintained at the higher pressure;
   (5) applying heat to the more dilute absorbent/water solution in the generation zone to evaporate fresh water vapor therefrom, producing thereby a relatively concentrated absorbent/water solution;
   (6) condensing the water vapor from (5) in a condensation zone by heat removal for discharge as relatively pure water; and
   (7) providing a common stream of heat transfer liquid passing through a heat exchanger in the generation zone, to and through a heat exchanger in the absorption zone and to and through a heat exchanger in the condensation zone, the heat transfer fluid providing thermal energy for water evaporation in the evaporation zone and the generation zone and acting as a heat sink for thermal energy removal from the absorption and the condensation zones.

* * * * *